United States Patent Office 2,890,933
Patented June 16, 1959

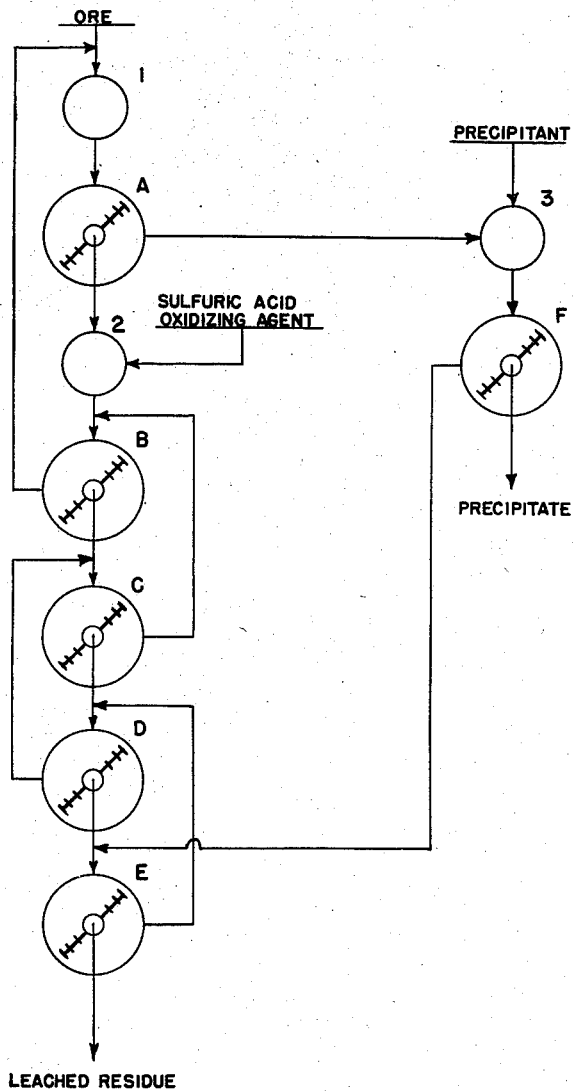

2,890,933

RECOVERY OF URANIUM VALUES FROM URANIUM BEARING RAW MATERIALS

Eugene J. Michal, Corpus Christi, Tex., and Robert R. Porter, Northcliff, Johannesburg, Transvaal, Union of South Africa, assignors to the United States of America as represented by the United States Atomic Energy Commission Application November 2, 1951, Serial No. 254,464

6 Claims. (Cl. 23—14.5)

This invention relates to the recovery of uranium from uranium-bearing raw materials such as uranium ores and concentrates, and uranium-containing residues resulting from the extraction of other elements from uranium-bearing ores.

It is an object of the present invention to provide an improved acid leaching process for extracting uranium from raw materials of this type. It is another object of the invention to provide a uranium extraction process that is especially useful for recovering uranium from raw materials containing only small quantities e.g. a few thousandths of a percent, of uranium. It is a further object of the invention to provide a uranium extraction process that can be carried out at ambient temperatures, i.e. without added heat. It is still another object of the invention to provide a uranium extraction process that utilizes relatively inexpensive reagents. Other objects of the invention will be in part obvious and in part pointed out hereafter.

In the copending application of A. M. Gaudin and R. Schuhmann, Jr. Serial No. 130,218, filed November 30, 1949, now Patent No. 2,736,634, issued February 28, 1956, a process for recovering uranium is described wherein a uranium-bearing ore in finely divided form is treated with an aqueous sulfuric acid solution containing dissolved iron salts. In one embodiment of the process disclosed in the Gaudin et al. application the ore is treated with cold dilute sulfuric acid to which commercial ferric sulfate has been added. The ferric ions in the leach solution apparently oxidize the uranium to a higher state of oxidation and thereby render it more completely soluble in the leaching solution. In any event it has been experimentally demonstrated that the presence of ferric ions in the leaching solution increases substantially the proportion of the uranium content of the ore that can be extracted by the leaching operation. The leaching solution can be separated from the residue by decantation or filtering and the uranium values recovered from the solution in any of various ways such as, for example, by neutralizing the solution with magnesium oxide to precipitate uranium compounds therefrom.

We have found that the embodiment of the Gaudin et al. process outlined above can, in certain cases, be advantageously modified to decrease the cost of the reagents used and to improve the efficiency thereof. More particularly we have found that the ferric sulfate of this prior process can be wholly or largely replaced by manganese dioxide which is not only less expensive but also appears to be a more effective oxidizing agent in this process. Thus in a number of cases higher recoveries of the uranium content of ores have been attained when using manganese dioxide as the principal oxidizing agent than when using ferric sulfate under comparable conditions.

It has been further found that while the uranium values of the ore can be oxidized with manganese dioxide alone in the absence of iron, it is preferable to have a small amount of soluble iron present in the leaching solution, since such a small quantity of ferrous or ferric iron apparently catalyzes the oxidation reaction with $MnO_2$ so that oxidation occurs at a more rapid rate. Ordinarily it is unnecessary to add this small quantity of iron to the leaching solution in the form of ferric sulfate. Thus many of the uranium-bearing raw materials to which the sulfuric acid extraction process is applicable contain a quantity of iron which is in such a form as to be soluble in the sulfuric acid leaching solution. Also the ore, before chemical treatment, is usually crushed and ground in apparatus composed essentially of iron and as an incident of these crushing and grinding steps a certain amount of iron is removed by abrasion from the crushing and grinding surfaces of the apparatus and introduced into the ore. The iron from these two sources dissolves in the sulfuric acid of the leach solution and usually is sufficient in quantity to perform the catalytic function referred to above.

While we do not wish to be bound by any particular theory concerning the present process, it is our present understanding that the superiority of manganese dioxide over ferric sulfate in processes of the present type is due at least in part to the fact that the oxidation-reduction potential of the $Mn^{+4}$—$Mn^{+2}$ couple is more negative than that of the $Fe^{+3}$—$Fe^{+2}$ couple, so that in the presence of $MnO_2$ the leaching solution has a higher oxidizing power than in the presence of ferric iron. In any event it has been experimentally demonstrated that sulfuric acid leaching solutions containing manganese dioxide are capable of removing a higher proportion of the uranium values from ores than leaching solutions containing equivalent amounts of ferric iron.

It may also be noted that in the case of ores having a high phosphate content, additional ferric iron should be added to the leaching solution, not to act as an oxidizing agent but rather as a complexing agent to tie up the phosphate and prevent it from precipitating with the uranium.

To summarize, in one of its broader aspects the present process comprises treating a finely divided uranium-bearing raw material with a mixture of sulfuric acid and manganese dioxide to oxidize uranium in the raw material to the hexavalent state and leach the resulting hexavalent uranium therefrom, and thereafter separating the leach liquor from the insoluble residue and neutralizing it to precipitate uranium compounds therefrom. The process may be carried out either as a batch operation or, as indicated in the specific examples given hereafter, as a continuous process.

It should be noted that the present process does not necessarily preclude the use of a leaching agent containing added iron salts, since in some cases it may be desirable to add iron in the form of ferric sulfate or in another form to the sulfuric acid-manganese dioxide leaching agent. However, the present process is especially useful because of the fact that it makes possible, in many cases, a highly efficient extraction of the uranium values by adding to the uranium-bearing raw material a leaching agent essentially composed of a mixture of sulfuric acid and manganese dioxide without added iron salts.

In order to point out more fully the nature of the present invention the following specific examples are given of illustrative methods of carrying out the process.

*Example 1*

A uranium, gold and iron bearing ore was treated in accordance with the process outlined above. The ore was a quartzite conglomerate containing about 10% of foliated silicates, such as sericite or pyrophyllite, and also contained about 2% pyrite and 0.5% carbonaceous material. The gold and uranium were mostly in a quartzitic matrix which surrounded quartz pebbles, but the carbonaceous material also carried both gold and uranium and an appreciable proportion of the gold was locked in the pyrite. The ore contained about 0.021% uranium, predominantly in the form of uraninite, and about 0.23 ounce of gold per ton of ore.

The ore was crushed and ground until 75% to 80% passed through a 200 mesh screen. Thereafter the ore was treated in the usual manner with aqueous sodium cyanide solution to remove gold therefrom.

The cyanidation residue was then treated for removal of uranium therefrom as indicated in the flow diagram of the accompanying drawing. Referring to the drawing, ore was fed into an agitator 1 at a rate of 17 pounds per hour and pulped with overflow liquor from thickener B to 25% solids. This overflow liquor was at a pH of approximately 2. The pH of the slurry in agitator 1 was approximately 3.5 so that any ferric iron in the liquor feeding this agitator was precipitated. Therefore, the overflow liquor from thickener B was partially neutralized by the ore which contained some soluble acid-consuming constituents. The retention time in agitator 1 was 11.5 hours. From agitator 1 the slurry was fed to thickener A. The overflow from this thickener was the final pregnant solution and was sent to precipitating tank 3. The uranium in this pregnant solution was precipitated with magnesium oxide (MgO) at a pH of approximate 6.5. The precipitate was dewatered by a thickener F and the barren solution was returned to the leaching system as a wash for the residue.

The underflow from thickener A was the partially leached ore containing precipitated ferric iron. This underflow at about 50% solids was sent to agitator 2, to which was added sulfuric acid and manganese dioxide ($MnO_2$). The pH in agitator 2 was approximately 2 and the retention time averaged 28.6 hours.

Slurry from agitator 2 was sent to thickener B. Overflow from thickener B was the liquor returned to agitator 1. Underflow from thickener B was the barren residue which was sent through a 3-stage countercurrent decantation system (thickeners C, D and E) for washing. The average washed residue contained 0.0041 percent $U_3O_8$, that is only 19.5 percent of the uranium originally contained in the ore; 80.5 percent of the uranium in the original ore was extracted in the leach liquor and sent to precipitation.

In this example manganese dioxide forms the primary source of oxidizing power and relatively small quantities of iron are provided by some acid-soluble iron-containing silicate minerals in the ore, metallic iron formed by the abrasion of machinery, and the cycled barren leach liquor. Obviously, in this cyclic system the iron added to the liquor by action of the acid on metallic iron and silicate minerals equals the iron removed from the liquor in the uranium precipitate and removed with the last wash going out of the system with the spent residue. The iron content of the leach liquor overflowing B and going to agitator 1 was approximately 1.3 gram Fe per liter, an amount equivalent, in a batch system, using addition of commercial ferric sulfate, to the iron in 27 pounds ferric sulfate per ton of feed. The sulfuric acid consumed was 38.7 pounds per ton of ore and the $MnO_2$ consumed was 4.65 pounds per ton of ore. The manganese dioxide was added in such a way as to maintain a ferric iron concentration of 0.3 gram ferric iron per liter in the overflow from thickener B. This amount of manganese dioxide is equivalent in oxidizing power to approximately 22 pounds of ferric sulfate per ton of feed.

*Example 2*

A uranium ore containing 0.45% $U_3O_8$, 66% $SiO_2$, 10% Fe, 7% $Al_2O_3$, 2.6% As, 3.9% S in the form of pyrite, 4.5% $CO_2$ in the form of carbonate, 4 oz. per ton of silver and minor amounts of Pb, Cu, Co, Ni, Sb, Ca, and Mg was ground until 55% of the ore was finer than 200 mesh and then subjected to acid leaching to recover the uranium. The major minerals and their approximate concentration are as follows: Quartz 58%, siderite 11%, sericite 17%, pyrite 8%, and arsenopyrite 6%. The uranium was present as pitchblende.

The ore was ground wet in a porcelain mill with flint balls. The slurry was adjusted to 60 percent solids and 3 lbs. of powdered iron, 200 lbs. of sulfuric acid, and 30 lbs. of $MnO_2$ were added per ton of dry ore. The iron was added to simulate plant conditions where steel mills would be used. The slurry was agitated at ambient temperature for 24 hours and then filtered. The filter cake was washed with water and the washings combined with the pregnant solution. Under the above conditions approximately 90% of the uranium in the ore was recovered in the leach liquor.

Another batch of the ore described above was treated under identical conditions with the exception that the $MnO_2$ was replaced by an equivalent amount of oxidizing agent in the form of $Fe_2(SO_4)_3 6H_2O$, specifically, about 155 lbs. per ton which is equivalent to 135 lbs. per ton of $Fe_2(SO_4)_3$. The uranium dissolved was only 84 percent of the uranium originally present in the ore.

These experiments demonstrate that $MnO_2$ not only can replace ferric sulfate as an oxidizing agent but actually is superior to ferric sulfate in its ability to oxidize and dissolve uranium from certain types of ores.

*Example 3*

A uranium bearing sandstone ore containing some shale from the Hite area in Utah having the following chemical analysis

| | | |
|---|---|---|
| $U_3O_8$ | percent | .66 |
| Cu | do | 4.0 |
| $Al_2O_3$ | do | 3.2 |
| $SiO_2$ | do | 82.5 |
| CaO | do | 0.1 |
| MgO | do | 0.1 |
| Fe | do | 1.9 |
| Total S | do | 2.8 |
| Ag | oz./ton | 1.7 | was initially crushed to approximately 4 mesh in a jaw crusher, and then reduced to minus 10 mesh with a cone type crusher and steel rolls in a closed circuit with a 10 mesh vibrating screen. The copper in this ore was present in large part as sulfides. The chief copper minerals which occurred as cementing materials in the sandstone, replacing quartz and in some cases organic material, were bornite, chalcopyrite, covellite, and chalcocite. The bulk of the uranium was in the form of a black, soft, sooty pitchblende some of which was a cementing material in the sandstone, replacing quartz and to a minor extent bornite. The pitchblende also occurred as a surface coating, partly oxidized to zippeite and more rarely to johannite. Other uranium minerals were uranophone, becquerelite and thucholite. The ores also contained from traces to small amounts of pyrite, hematite, galena, sphalerite and cobalt arsenides such as safflorite, loellingite, and glaucodot.

Ore having the composition given above, after being ground as described, was pulped to 50 percent solids with water and 100 lbs. of sulfuric acid per ton of ore. No oxidizing agent was added other than the ferric iron and cupric copper obtained by dissolution from the ore itself. The slurry was agitated at ambient temperature for 24 hours and then filtered and washed under the usual conditions employed in laboratory testing. The pH of the pregnant solution was approximately 0.8, and its potential as measured with a platinum and saturated calomel electrode system was —360 millivolts. The pregnant solution contained 4.44 grams per liter of $U_3O_8$ and 4.2 grams per liter of copper representing extractions of 89.5 percent and 18.4 percent of the uranium and copper originally present in the ore, respectively.

When the ore was leached under the same conditions as described above, but in addition to the acid 50 pounds of $MnO_2$ per ton of ore was added to the slurry, a pregnant solution containing 5.59 grams per liter of $U_3O_8$ and 6.9 grams per liter of copper was obtained. The pH of this solution was 1.6 and the potential was −625 millivolts indicating a much higher power of oxidation than obtained previously. The uranium and copper in solution represented 97.4 percent and 25.1 percent of the uranium and copper respectively originally present in the ore.

The addition of 50 lbs. of $MnO_2$ per ton of ore increased the extraction of uranium by approximately 8 percent and the extraction of copper by about 7 percent. The increase in copper recovery is not particularly significant, but the increase in uranium extraction is important, and the value of the uranium recovered far overshadows the cost of the $MnO_2$.

From the foregoing description it will be apparent that the process of the present invention is capable of achieving the several objects set forth in the introductory portion of the present specification. It is of course to be understood that this description is illustrative only and that numerous changes can be made therein without departing from the scope of the invention as set forth in the claims appended hereto.

We claim:

1. A process for recovering uranium from a uranium-bearing raw material which comprises leaching said material with a leaching agent comprising aqueous sulfuric acid containing dissolved iron salts and manganese dioxide to oxidize and leach uranium values from said raw material, separating the leach liquor from the leach residues and neutralizing the leach liquor to precipitate uranium compounds therefrom.

2. A process for leaching uranium from a uranium-bearing raw material which comprises continuously leaching said raw material at ambient temperatures with a leaching agent comprising aqueous sulfuric acid containing ferric ions and manganese dioxide.

3. A process as defined in claim 2 and wherein the pregnant leach liquor is separated from the leach residue by continuous countercurrent decantation.

4. A process as defined in claim 2 and wherein the pregnant leach liquor is separated from the leach residue by filtration.

5. A process for recovering uranium from a uranium- and iron-bearing raw material which comprises treating said raw material with a mixture of aqueous sulfuric acid and manganese dioxide to (a) dissolve iron from said material (b) oxidize the dissolved iron to the ferric state and (c) cause the resulting aqueous mixture containing acid, ferric ions and manganese dioxide to leach uranium values from said raw material, and then neutralizing the resulting leach solution to precipitate uranium compounds therefrom.

6. A process for recovering uranium from a uranium-bearing raw material which comprises the steps of reducing said raw material to a finely divided condition in apparatus made essentially of iron whereby a small amount of metallic iron is introduced into said material, treating said raw material with aqueous sulfuric acid and manganese dioxide to dissolve the iron introduced into said material from said apparatus and to leach uranium values from said raw material, and neutralizing the resulting leach solution to precipitate uranium compounds therefrom.

References Cited in the file of this patent

UNITED STATES PATENTS 2,176,610    Stamberg _____ Oct. 17, 1939

OTHER REFERENCES

Pochon: Chemical and Metallurgical Engineering, vol. 44, No. 7, pp. 362–5 (1937).

Perry: Chemical Engineers' Handbook, 2nd ed., page 1643 (1941). Published by McGraw-Hill, New York.

Pannell et al.: A.E.C. Declassified paper MITG–A63, 31 pages, particularly page 3. Dated March 21, 1949, declassified April 11, 1956.

Katz et al.: The Chemistry of Uranium, pp 114 and 115. Received in Patent Office Library, September 25, 1951. Pub. by McGraw-Hill, New York.